US005322895A

United States Patent [19]
Masse et al.

[11] Patent Number: 5,322,895
[45] Date of Patent: Jun. 21, 1994

[54] RADIATION CURED ADHESIVE COMPOSITION

[75] Inventors: Michael A. Masse, Richmond; James R. Erickson, Katy, both of Tex.

[73] Assignee: Shell Oil Company, Houston, Tex.

[21] Appl. No.: 84,684

[22] Filed: Jun. 29, 1993

[51] Int. Cl.$^5$ .................. C08L 53/02; C08F 297/04
[52] U.S. Cl. .................................. 525/98; 525/99; 524/575; 522/158
[58] Field of Search ............. 525/98, 99; 524/575; 522/158

[56] References Cited

U.S. PATENT DOCUMENTS

| | | | |
|---|---|---|---|
| 4,248,984 | 2/1981 | Bi et al. | 525/314 |
| 4,346,193 | 8/1982 | Warfel | 525/52 |
| 4,386,125 | 5/1983 | Shiraki | 428/36 |
| 4,391,949 | 7/1983 | St. Clair | 525/99 |
| 4,444,953 | 4/1984 | St. Clair | 525/98 |
| 4,485,210 | 11/1984 | Neiditch et al. | 525/53 |
| 4,780,367 | 10/1988 | Lau et al. | 428/355 |
| 5,104,921 | 4/1992 | Erickson et al. | 524/274 |
| 5,115,008 | 5/1992 | Sasaki | 524/271 |

FOREIGN PATENT DOCUMENTS 61-200150 9/1986 Japan.
2086075 4/1987 Japan.

Primary Examiner—James J. Seidleck
Assistant Examiner—I. Zemel
Attorney, Agent, or Firm—Donald F. Haas

[57] ABSTRACT

The present invention is a cured adhesive composition with enhanced properties prepared by the high energy ionizing radiation initiated curing of a polymer composition. The polymer composition comprises from $\frac{1}{8}$ to $\frac{3}{8}$% by weight of the polymer composition of a block copolymer having the structure $$(D-A-B)_x-Y-C_z$$

where A is a polymer block of a vinyl aromatic hydrocarbon, B, C and D are polymer blocks of a conjugated diene, Y is a coupling agent or coupling monomers or initiator, x ranges from 3 to 30, z ranges from 0 to 10, the molecular weight of the A blocks ranges from 5,000 to 25,000, the molecular weights of the B and C blocks range from 15,000 to 100,000 and the molecular weight of the D blocks ranges from 500 to 5,000 in one embodiment and above 5000 to 50,000 in the other; and a tackifying resin.

9 Claims, No Drawings

RADIATION CURED ADHESIVE COMPOSITION

BACKGROUND OF THE INVENTION

This invention relates to adhesive compositions, and more particularly, to adhesive compositions cured by subjection to ionizing radiation which promotes crosslinking of elastomeric block copolymers contained in the composition during exposure to the radiation.

Curing of adhesives based on conjugated diolefins and, optionally, vinyl aromatics has increased the range of service properties for such adhesives. Radiation curing and chemical curing of polymers to make such adhesives is known. This curing causes covalent crosslinking of the polymerized conjugated diolefins which is evidenced by a gel content of the crosslinked polymer. Before crosslinking, the polymers are melt processable but after crosslinking, the gel cannot be processed as melts. Crosslinking therefore enhances solvent resistance and improves elevated temperature shear properties. Compositions can therefore be applied to a substrate in a melt and then crosslinked to form a superior adhesive.

U.S. Pat. Nos. 4,391,949 and 4,780,367 disclose star shaped block copolymers of vinyl aromatic hydrocarbons and conjugated dienes which are particularly useful in adhesive compositions. The common feature of these polymers is that they each contain arms which have at least one block of a vinyl aromatic hydrocarbon and at least one block of a conjugated diene and the arms are coupled at a central point with a coupling agent or coupling monomers or initiator. These polymers are especially amenable to radiation crosslinking such as described in U.S. Pat. No. 5,104,921. The polymers are combined with a tackifying resin and subjected to high energy ionizing radiation to initiate cure of the polymer and the tackifying resin.

SUMMARY OF THE INVENTION

This invention relates to a cured adhesive composition with enhanced peel strength prepared by the high energy ionizing radiation initiated curing of a polymer composition. The polymer composition comprises from 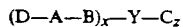 to ⅜% by weight of the polymer composition of a block copolymer having the structure $$(D-A-B)_x-Y-C_z$$

where A is a polymer block of a vinyl aromatic hydrocarbon, B, C and D are polymer blocks of a conjugated diene, Y is a coupling agent or coupling monomers or initiator, x ranges from 3 to 30, z ranges from 0 to 10, the molecular weight of the A blocks ranges from 5,000 to 25,000, the molecular weights of the B and C blocks range from 15,000 to 100,000 and the molecular weight of the D blocks ranges from 500 to 5000 in one embodiment and above 5000 to 50,000 in another embodiment. The polymer composition to be irradiated also contains a tackifying resin which preferably is an unsaturated hydrocarbon resin. The ratio of the molecular weight of the D blocks to the molecular weight of the A blocks ranges from 0.25 to 1.0 in the first embodiment and above 1.0 to 3.0 in the other. In a preferred embodiment, the B, C and D blocks are selected from the group consisting of polyisoprene and polybutadiene.

DETAILED DESCRIPTION OF THE INVENTION

The A blocks are polymer blocks of a vinyl aromatic hydrocarbon. Preferably, the vinyl aromatic hydrocarbon is styrene. Other useful vinyl aromatic hydrocarbons from which the thermoplastic (nonelastomeric) blocks may be formed include alphamethyl styrene, tertbutyl styrene, paramethyl styrene and the other ring alkylated styrenes as well as mixtures of the same.

The B, C and D blocks are polymer blocks of conjugated dienes. The preferred dienes are butadiene and isoprene. A much preferred diene is isoprene. While the conjugated diene employed in each block may differ from that employed in the other blocks, it is preferred that the same diene be employed in all blocks because of ease of processing. Mixtures of conjugated dienes may also be employed.

The Y moiety stands for a multifunctional coupling agent or coupling monomers or initiators. There are a wide variety of such coupling agents or initiators that can be employed—the main requirement is that the coupling agent must be multifunctional. A much preferred coupling agent is a polyalkenyl aromatic coupling agent. The most preferred coupling agent is divinyl benzene because of its high efficiency in coupling to high arm number. Polyalkenyl aromatic coupling agents capable of forming star shaped polymers are known in the art. See generally, Canadian patent number 716,645 and U.S. Pat. Nos. 4,010,226 and 3,985,830 which are herein incorporated by reference. A detailed description of a variety of such coupling agents is found in U.S. Pat. No. 4,391,949 which is herein incorporated by reference. Examples of suitable polyvinyl aromatic compounds are 1,2-divinyl benzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,2-divinyl-3,4-dimethylbenzene, 1,5,6-trivinyl-3,7-diethylnaphthalene, 1,3-divinyl-4,5,6-tributylnaphthalene, 2,2'-divinyl-4-ethyl-4'-propylbiphenyl and the like. Divinyl aromatic hydrocarbons containing up to 26 carbon atoms per molecule are preferred for employment according to this invention. As stated above, particularly preferred is divinylbenzene in either its ortho, meta or para isomer and commercial divinylbenzene which is a mixture of said isomers is also quite satisfactory.

The letters x and z stand for the relative number of arms in each polymer molecule. Accordingly, x and z are integers when referring to a single polymer molecule. However, a polymer mass will necessarily contain molecules of varying functionality. With regard to the present invention, it is important that, for the average molecule in the polymer mass, the sum of x and z be at least 3 or greater, therein resembling a star-shaped polymer molecule. Preferably, the number of arms (x+z) is between 3 and 30, more preferably between 6 and 25.

If z is not 0, then the polymer is an asymmetric polymer by definition. In this case, the ratio of x arms to z arms has an effect on a number of properties including the tensile strength of the polymer. In the embodiment wherein D is a relatively small block the ratio of the molecular weight of the D blocks to the molecular weight of the A blocks ranges from 0.25 to 1.0 because in this range, enhanced high temperature shear properties (SAFT) are found. When D is a larger block, the ratio should be above 1.0 to 3.0 to obtain enhanced peel strength.

The polymers of the present invention are produced by anionic polymerization employing an organomonolithium (other alkali metals may also be used) initiator. The organomonolithium compounds (initiators) that are reacted with the polymerizable additive in this invention are represented by the formula RLi, wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tertoctyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-hepthylcyclohexyllithium, 4-cyclopentylbutyl-lithium, and the like. The alkyllithium compounds are preferred for employment according to this invention, especially those wherein the alkyl group contains from 3 to 10 carbon atoms. A much preferred initiator is sec-butyllithium. See U.S. Pat. No. 3,231,635 which is herein incorporated by reference. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of $-60°$ to $+300°$ F. and at pressures which are sufficient to maintain the reaction mixture in the liquid phase.

The first step of the process involves contacting the conjugated diene for block D and the organomonolithium compound (initiator) in the presence of an inert diluent therein forming a living polymer compound having the simplified structure D-Li. Next, the vinyl aromatic hydrocarbon is contacted with the living polymer and the living polymer D-A-Li is formed. The vinyl aromatic hydrocarbon is preferably styrene.

The anionic polymerization is carried out in an inert diluent. The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. Next the living polymer in solution is contacted with a conjugated diene. Preferred dienes include butadiene and isoprene. A much preferred diene is isoprene. The resulting living polymer has a simplified structure D-A-B-Li.

The C-Li polymer arms, if needed, may be formed in a separate reactor employing an inert solvent, organomonolithium initiator and conjugated diene monomer. In an alternative embodiment, the C-Li arms may be formed in the same reactor as the D-A-B-Li polymer arms. In that case, after the D-A-Li arms are formed, additional initiator is added. Then the conjugated diene monomers B and C are added. In this alternative embodiment, the B and C arms will necessarily be similar in composition and molecular weight.

The living D-A-B-Li and C-Li polymer arms are then reacted with a multifunctional coupling agent. The polyalkenyl aromatic coupling agent should be added to the living polymer after the polymerization of the monomers is substantially complete, i.e., the agent should only be added after substantially all of the monomer has been converted to living polymers.

The amount of polyalkenyl aromatic coupling agent added may vary between wide limits but preferably at least 0.5 mole is used per mole of unsaturated living polymer. Amounts of from 1 to 15 moles, preferably from 1.5 to 5 moles are preferred. The amount, which may be added in two or more stages, is usually such so as to convert at least 80 or 85% w of the living polymers into star-shaped polymers, preferably at least 90% w are coupled.

The coupling reaction step may be carried out in the same solvent as for the polymerization reaction step. A list of suitable solvents is given above. The coupling reaction step temperature may also vary between wide limits, e.g., from 0° to 150° C., preferably from 20° to 120° C. The reaction may also take place in an inert atmosphere, e.g., nitrogen and under pressure e.g. a pressure of from 0.5 to 10 bars.

The star-shaped polymers prepared are characterized by having a dense center or nucleus of crosslinked poly(polyalkenyl coupling agent) and a number of arms of substantially linear unsaturated polymers extending outward therefrom. The number of arms may vary considerably but is typically from 3 to 30, preferably from 6 to 25. From the above it can be seen that Y is preferably a poly(divinylbenzene)nucleus. As stated above it is believed that the nuclei are crosslinked.

Following the coupling reaction the product is neutralized such as by the addition of terminators, e.g., hydrogen, water, alcohol or other reagents, for the purpose of removing the lithium radical from the nucleus for the condensed polymer product. The product is then recovered such as by coagulation utilizing hot water or steam or both.

Molecular weights of linear polymers or unassembled linear segments of polymers such as mono-, di-, triblock, and etc., arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. The "peak" molecular wight is nearly the same as the weight average molecular weight of the linear polymer or arm. Frequently, two peaks will be observed for unassembled asymmetric stars. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore sized directly into the light scattering cell. The light scattering measurements are performed as a function of scattering angle and of polymer concentration using standard procedures. The differential refractive index (DRI) of the sample is measured at the same wavelength and in the same solvent used for the light scattering. The light scattering method may also have to be used to characterize the molecular weight of the unassembled arms, if the arm molecular weight distribution is broad. The following references are herein incorporated by reference:

1. *Modern Size-Exclusion Liquid Chromatography*, M. W. Yau, J. J. Kirkland, D. D. Bly, John Wiley & Sons, New York, N.Y., 1979.
2. *Light Scattering from Polymer Solutions*, M. B. Huglin, ed., Academic Press, New York, N.Y. 1972.
3. W. Kay and A. J. Havlik, *Applied Optics*, 12, 541 (1973).
4. M. L. McConnell, *American Laboratory*, 63, May, 1978.

The polymers of this invention are preferably cured (crosslinked) by ultraviolet or electron beam radiation, but radiation curing utilizing a wide variety of electromagnetic wavelengths is feasible. Either ionizing radiation such as alpha, beta, gamma, X-rays and high energy electrons or non-ionizing radiation such as ultraviolet, visible, infrared, microwave and radio frequency may be used. The details of radiation curing are given in commonly assigned U.S. Pat. No. 5,104,921 which is herein incorporated by reference.

In adhesive applications, it is necessary to add an adhesion promoting or tackifying resin that is compatible with the polymer. A common tackifying resin is a diene-olefin copolymer of piperylene and 2-methyl-2-butene having a softening point of about 95° C. This resin is available commercially under the tradename Wingtackl ® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins, such as Piccotex ®120 resin, may be employed wherein the resinous copolymer comprises 20-80 weight percent of piperylene and 80-20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins and polymerized mixed olefins, lower softening point resins and liquid resins. An example of a liquid resin is Adtac ® LV resin from Hercules. To obtain good thermo-oxidative and color stability, it is preferred that the tackifying resin be a saturated resin, e.g., a hydrogenated dicyclopentadiene resin such as Escorez ® 5000 series resin made by Exxon or a hydrogenated polystyrene or polyalphamethyl styrene resin such as Regalrez ® resin made by Hercules. The amount of adhesion promoting resin employed varies from about 10 to about 400 parts by weight per hundred parts rubber (phr), preferably between about 20 to about 350 phr. The selection of the particular tackifying agent is, in large part, dependent upon the specific polymer employed in the respective adhesive composition.

It is preferred that the tackifying resin be an unsaturated hydrocarbon resin. Such resins give the adhesive better peel strength. It is thought that this occurs because of better compatibility of the unsaturated resin and polymer.

The adhesive composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo ® 6056 and 6204 oil made by Arco and process oils, e.g. Sheliflex ® 371 oil made by Shell. The amounts of rubber compounding oil employed in the invention composition can vary from 0 to about 500 phr, preferably between about 0 to about 100 phr and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition. Antioxidants which may be used include sterically hindered phenolics, phosphites and thioethers, such as hydroxyphenylpropionates, aryl phosphates, thioethers, amino phenols and aryl phosphates. Specific examples of useful antioxidants include 3-(3,5-di-t-butyl-4-hydroxyphenyl)propionate)methane (Irganox ® 1010 from Ciba-Geigy), tris(nonylphenyl)phosphite (Polygard ® HR from Uniroyal), bis(2,4-di-t-t-butyl)pentaerythritol disphosphite (Ultranox ® 626 from GE Chemicals), 4-((4,6-bis(octylthio)-s-triazin-2-yl)amino)-2,6-di-t-butylphenol (Irganox ® 565).

Additional stabilizers known in the art may also be incorporated into the adhesive composition. These may be for protection during the life of the article against, for example, oxygen, ozone and ultra-violet radiation. However, these additional stabilizers should be compatible with the essential stabilizers mentioned hereinabove and their intended function as taught herein.

The adhesive compositions of the present invention are typically prepared by blending the components at an elevated temperature, preferably between about 50° C. and about 200° C., until a homogeneous blend is obtained, usually less than three (3) hours. Various methods of blending are known to the art and any method that produces a homogeneous blend is satisfactory. The resultant adhesives may then preferably be used in a wide variety of product assembly applications. Alternatively, the ingredients may be blended into a solvent.

The adhesive compositions of the present invention may be utilized as many different kinds of adhesives, for example, pressure sensitive adhesives for tapes, labels, etc., particularly when high temperature performance and/or solvent resistance is desired.

EXAMPLES

Three polymers were used in the following examples. The first, Polymer 1, is an example of the prior art and was made according to U.S. Pat. No. 4,444,953, which is herein incorporated by reference. The polymer is an asymmetric star polymer containing arms which contain styrene blocks having a molecular weight of 11,200 and isoprene blocks having a molecular weight of 67,000. The asymmetric isoprene arms also have a molecular weight of 67,000.

The other two polymers, Polymer II and Polymer III, are examples of polymers which fall within the scope of the present invention. They were made according to the process described above wherein isoprene blocks were made by anionic polymerization, styrene blocks were added thereto and then other isoprene blocks were added to the isoprene-styrene living polymer. Polyisoprene blocks were made and the two sets of arms were coupled with a divinylbenzene coupling agent.

The polystyrene contents and block molecular weights are shown in Table 1 below. The block molecular weights were determined using GPC as previously discussed. The polystyrene content was determined using proton NMR. PSC is polystyrene content in percent, MS is the molecular weight of the styrene block, MI, tail is the molecular weight of the isoprene endblock and MI, central is the molecular weight of the central isoprene block which is coupled directly to the coupling agent.

TABLE 1

| Polymers | I | II | III |
|---|---|---|---|
| PSC | 10.5 | 11.4 | 12.5 |
| MS | 11,200 | 13,800 | 10,300 |
| MI, tail | — | 1,550 | 31,200 |
| MI, central | 67,000 | 73,900 | 37,200 |

These polymers were compared in two different adhesive formulations. One adhesive formulation used tackifying resins which were all unsaturated hydrocarbon resins. The other formulation, formulation B, used a high percentage of a saturated tackifying resin. Formulations A and B are shown below in Table 2:

TABLE 2

| Formulations: | A | B |
|---|---|---|
| Polymer | 49.6 | 44.64 |
| Wingtack 95 | 42.7 | 0 |
| Adtac LV | 6.9 | 17.89 |
| Escorez 5380 | 0 | 36.67 |
| Irganox 565 | 0.3 | 0.3 |
| Ultranox 626 | 0.5 | 0.5 |

Wingtack ® 95 resin is a $C_5$ hydrocarbon resin made by Goodyear Chemical. It is unsaturated (% unsaturation —14%). Adtack ® LV resin is an unsaturated aliphatic hydrocarbon resin made by Hercules (% unsaturation—6%). Escorez ® 5380 resin is a hydrogenated hydrocarbon resin made by Exxon Chemical (% unsaturation—<1%). Irganox ® 565 and Ultranox ® 626 are antioxidants used to stabilize the formulations.

The components of the formulation were mixed in toluene. The concentration of the formulation components in solution was 40% by weight. The solution was then coated on poly(ethylene terephthalate) film to give a 1 mil adhesive layer thickness. Test specimens were cut from this film for adhesive property testing.

EXAMPLE 1

In this example, Polymer III, the polymer with the longer "tail" (isoprene endblock) was used in both formulations A and B. At the same time, the prior art polymer, Polymer I, was also used to make formulations A and B. The adhesive properties of these two groups of formulations were determined and are contrasted in Tables 3 (for Polymer III) and 4 (for Polymer I) below.

The SAFT (shear adhesion failure temperature) was measured by 1"×1" Mylar to Mylar lap joint with a 1 kg weight. SAFT measures the temperature at which the lap shear assembly fails under load. Rolling Ball Tack (RBT) is the distance a steel ball rolls on the adhesive film with a standard initial velocity (Pressure Sensitive Tape Council Test No. 6). Small numbers indicate aggressive tack. Holding Power (HP) is the time required to pull a standard area (½ in. ×½ in.) of tape from a standard test surface (steel, Kraft paper) under a standard load (2 kg), in shear at 2° antipeel (Pressure Sensitive Tape Council Method No. 7) long times indicate high adhesive strength. 180° peel was determined by Pressure Sensitive Tape Council Method No. 1. Large numbers indicate high strength when peeling a test tape from a steel substrate. Polyken probe tack (PPT) was determined by ASTM D-2979. Loop tack (LT) was determined using TLMI loop tack tester. High numbers for PPT and LT indicate aggressive tack. The percent gel measures the amount of crosslinking that took place by irradiating the formulation. Dose is the amount of electron beam radiation in Mrads which was applied to the formulation.

TABLE 3

| Polymer | III | | | III | | |
|---|---|---|---|---|---|---|
| Formulation | A | | | B | | |
| Dose | 0 | 3 | 5 | 0 | 3 | 5 |
| RBT, cm | 2.5 | 5.5 | 3.3 | 2.3 | 1.1 | 4.4 |
| PPT, kg | 1.181 | 1.262 | 1.111 | 0.969 | 1.017 | 1.092 |
| LT, oz/in | 91.0 | 96.0 | 92.5 | 74.8 | 65.0 | 67.3 |
| 180° peel, pli | 6.5 | 6.0 | 6.3 | 2.8 | 2.6 | 3.0 |
| HP/K, min | 191 | 318 | 2063 | 9 | 7 | 12 |
| HP/S, min | 597 | 1278 | 1007 | 41 | 37 | 43 |
| SAFT/K, °C. | 60.8 | 75.0 | 75.0 | 53.8 | 64.3 | 69.5 |
| SAFT/M, °C. | 81.0 | 102.8 | 116.8 | 65.5 | 97.0 | 101.3 |
| Gel, % | 1.2 | 20.0 | 69.4 | 3.0 | 68.6 | 83.6 |

TABLE 4

| Polymer | I, control | | | I, control | | |
|---|---|---|---|---|---|---|
| Formulation | A | | | B | | |
| Dose | 0 | 3 | 5 | 0 | 3 | 5 |
| RBT, cm | 4.3 | 3.0 | 4.0 | 4.2 | 2.2 | 3.9 |
| PPT, kg | 1.063 | 1.152 | 1.171 | 0.891 | 1.042 | 0.836 |
| LT, oz/in | 90.8 | 98.5 | 85.8 | 60.3 | 59.0 | 60.0 |
| 180° peel, pli | 4.8 | 4.0 | 5.1 | 2.6 | 2.5 | 2.8 |
| HP/K, min | 663 | 599 | 364 | 4 | 6 | 4 |
| HP/S, min | 7856 | 1178 | 447 | 33 | 4 | 18 |
| SAFT/K, C. | 59.0 | 57.3 | 85.3 | 74 | 73.3 | 73.5 |
| SAFT/M. C. | 101.0 | 121.0 | 103.5 | 83.8 | 122.5 | 121.3 |
| Gel, % | 0.8 | 81.3 | 92.8 | 0.0 | 88.7 | 95.0 |

It can be seen by comparing the data formulation A for Polymer III with that of Polymer I that the polymer of the present invention provides an adhesive formulation with significantly enhanced 180° peel strength. Formulation A is the one which utilizes only unsaturated tackifying resins. It is significant to note that the total amount of crosslinking for formulation A using Polymer III was significantly less than the total amount of crosslinking with formulation B with the same polymer. This demonstrates the advantage of using hydrogenated resins to achieve improved gel contents. However, the benefit of increased peel of Polymer III is only realized with unsaturated resins.

EXAMPLE 2

In this example, the polymer of the present invention with the shorter endblock or tail, Polymer II, was compared with Polymer I in both formulations A and B. The experiments and comparisons were carried out in the same manner as in Example 1. The results are shown below in Tables 5 and 6.

TABLE 5

| Polymer | II | | | II | | |
|---|---|---|---|---|---|---|
| Formulation | A | | | B | | |
| Dose | 0 | 3 | 5 | 0 | 3 | 5 |
| RBT, cm | 3.8 | 3.6 | 5.1 | 1.5 | 4.2 | 5.7 |
| PPT, kg | 0.901 | 0.805 | 0.801 | 0.805 | 0.782 | 0.811 |
| LT, oz/in | 86.5 | 52.0 | 57.3 | 60.5 | 54.8 | 39.5 |
| 180° peel, pli | 4.3 | 4.7 | 4.6 | 2.4 | 2.3 | 2.6 |
| HP/K, min | 474 | 877 | 431 | 7 | 2 | 19 |
| HP/S, min | 376 | 272 | 515 | 22 | 32 | 71 |
| SAFT/K, C. | 65.0 | 77.5 | 78.0 | 63.4 | 72.5 | 60.8 |
| SAFT/M, C. | 95.1 | 135.1 | 137.9 | 81.8 | 119.1 | 121.6 |
| Gel, % | 0.0 | 66.2 | 95.7 | 0.0 | 85.5 | 89.2 |

TABLE 6

| Polymer | I, control | | | I, control | | |
|---|---|---|---|---|---|---|
| Formulation | A | | | B | | |
| Dose | 0 | 3 | 5 | 0 | 3 | 5 |
| RBT, cm | 3.6 | 2.6 | 3.9 | 1.7 | 1.9 | 3.3 |
| PPT, kg | 0.639 | 0.790 | 0.906 | 0.937 | 0.756 | 0.864 |
| LT, oz/in | 69.0 | 79.3 | 73.0 | 60.0 | 41.0 | 52.3 |
| 180° peel, pli | 4.1 | 4.9 | 4.2 | 2.4 | 2.5 | 2.4 |
| HP/K, min | 806 | 838 | 214 | 10 | 7 | 16 |
| HP/S, min | 2476 | 307 | 808 | 93 | 151 | 59 |
| SAFT/K, C. | 57.8 | 71.9 | 65.5 | 71.9 | 67.4 | 76.4 |
| SAFT/M, C. | 99.4 | 136.0 | 127.4 | 86.0 | 128.3 | 116.3 |
| Gel, % | 0.0 | 86.0 | 91.3 | 0.0 | 95.7 | 91.2 |

It can be seen that formulation A made with the polymer of the present invention, Polymer II, has significantly better SAFT then formulation A made with the prior art polymer, Polymer I.

We claim:

1. A cured adhesive composition prepared by the high energy ionizing radiation initiated curing of a polymer composition, said polymer composition comprising
   (a) from $\frac{1}{3}$ to $\frac{2}{3}$% by weight of the polymer composition of a block copolymer having the structure $$(D-A-B)_x-Y-C_z$$

where A is a polymer block of a vinyl aromatic hydrocarbon, B, C and D are polymer blocks of a conjugated diene, Y is a coupling agent or coupling monomers or initiator, x ranges from 3 to 30, z ranges from 1 to 10, the molecular weight of the A blocks ranges from 5,000 to 25,000, the molecular weights of the B and C blocks range from 15,000 to 100,000 and the molecular weight of the D blocks ranges from above 5000 to 50,000; and
   (b) a tackifying resin.

2. The composition of claim 1 wherein the ratio of the molecular weight of the D blocks to the molecular weight of the A blocks ranges from above 1.0 to 3.0.

3. The composition of claim 1 wherein the B, C and D blocks are polyisoprene or polybutadiene.

4. The composition of claim 1 wherein the tackifying resin is an unsaturated hydrocarbon resin.

5. A cured adhesive composition prepared by the high energy ionizing radiation initiated curing of a polymer composition, said polymer composition comprising
   (a) from $\frac{1}{3}$ to $\frac{2}{3}$% by weight of the polymer composition of a block copolymer having the structure $$(D-A-B)_x-Y-C_z$$

where A is a polymer block of a vinyl aromatic hydrocarbon, B, C and D are polymer blocks of a conjugated diene, Y is a coupling agent or coupling monomers or initiator, x ranges from 3 to 30, z ranges from 0 to 10, the molecular weight of the A blocks ranges from 5,000 to 25,000, the molecular weights of the B and C blocks range from 15,000 to 100,000 and the molecular weight of the D blocks ranges from above 500 to 5000; and
   (b) a tackifying resin.

6. The composition of claim 5 wherein the ratio of the molecular weight of the D blocks to the molecular weight of the A blocks ranges from above 0.25 to 1.0.

7. The composition of claim 5 wherein the B, C and D blocks are polyisoprene or polybutadiene.

8. The composition of claim 5 wherein the tackifying resin is an unsaturated hydrocarbon resin.

9. The composition of claim 5 wherein z is at least 1.

* * * * *

UNITED STATES PATENT AND TRADEMARK OFFICE
CERTIFICATE OF CORRECTION

PATENT NO.  : 5,322,895
DATED       : June 21, 1994
INVENTOR(S) : Michael A. Masse, James R. Erickson It is certified that error appears in the above-identified patent and that said Letters Patent is hereby corrected as shown below:

Title page, item [57],
In the abstract, line 5, delete "%."

Column 1, line 46, delete "%."

Claim 1, column 9, line 36, delete "%."

Claim 5, column 10, line 19, delete "%."

Signed and Sealed this

Nineteenth Day of October, 1999

Attest:

Q. TODD DICKINSON

Attesting Officer

Acting Commissioner of Patents and Trademarks